United States Patent
Toda

(10) Patent No.: US 8,204,193 B2
(45) Date of Patent: Jun. 19, 2012

(54) TELEPHONE DEVICE

(75) Inventor: Toshiyuki Toda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1586 days.

(21) Appl. No.: 11/570,687

(22) PCT Filed: Oct. 3, 2005

(86) PCT No.: PCT/JP2005/018288
§ 371 (c)(1),
(2), (4) Date: Dec. 15, 2006

(87) PCT Pub. No.: WO2006/038586
PCT Pub. Date: Apr. 13, 2006

(65) Prior Publication Data
US 2008/0019494 A1    Jan. 24, 2008

(30) Foreign Application Priority Data

Oct. 4, 2004  (JP) ................................. 2004-291231

(51) Int. Cl.
*H04M 1/56* (2006.01)
(52) U.S. Cl. ........... 379/142.16; 348/14.01; 348/E5.102
(58) Field of Classification Search ............... 379/88.13, 379/142.1, 142.04, 142.06, 142.11, 142.13, 379/142.16, 142.17, 88.11, 88.21; 348/14.01, 348/E5.102
See application file for complete search history.

(56) References Cited

U.S. PATENT DOCUMENTS 5,805,677 A * 9/1998 Ferry et al. ................. 379/93.35
5,825,862 A * 10/1998 Voit et al. ................... 379/142.16
7,293,279 B1 * 11/2007 Asmussen ..................... 725/102

(Continued)

FOREIGN PATENT DOCUMENTS

CN  1413009  * 4/2003

(Continued)

OTHER PUBLICATIONS

Office Action issued on Jun. 5, 2009, in corresponding Chinese Patent Application No. 200580022316.X.

(Continued)

*Primary Examiner* — Curtis Kuntz
*Assistant Examiner* — Yosef K Laekemariam
(74) *Attorney, Agent, or Firm* — Seed IP Law Group PLLC

(57) ABSTRACT

The television receiver apparatus in the prior art has such a problem that, when phone calls come in this receiver set while the user watches a television, incoming calls of all phone calls are informed and also the television watching is suspended or interrupted. A telephone device of the present invention includes a phone book portion 7 for storing previously the sender information used to specify the sender as phone book information, and an incoming call display control portion 8 for executing control such that the sender information obtained from the incoming call sensing portion 5 is compared with the phone book information when the incoming call sensing portion sensed the incoming call while the content of the television broadcasting is displayed on the display portion 9, and the content of the television broadcasting and the sender information or the phone book information are displayed simultaneously on the display portion 9 when the sender information coincides with the phone book information or the sender information or the phone book information is not displayed when the sender information does not coincide with the phone book information. Such an effect can be achieved that, when the phone call comes in from the sender except those being listed previously in the phone book portion while the user watches the television, it can be prevented that the incoming call is displayed simultaneously on the television screen.

18 Claims, 16 Drawing Sheets

U.S. PATENT DOCUMENTS

| | | | |
|---|---|---|---|
| 2002/0045438 A1 | 4/2002 | Tagawa et al. | |
| 2003/0054864 A1 | 3/2003 | Mergler | |
| 2004/0055011 A1 | 3/2004 | Bae et al. | |
| 2004/0193691 A1* | 9/2004 | Chang | 709/206 |
| 2005/0028206 A1* | 2/2005 | Cameron et al. | 725/46 |
| 2005/0239446 A1 | 10/2005 | Tagawa et al. | |
| 2006/0031886 A1 | 2/2006 | Bae et al. | |
| 2006/0160576 A1 | 7/2006 | Matsuoka | |
| 2011/0077049 A1 | 3/2011 | Tagawa et al. | |

FOREIGN PATENT DOCUMENTS

| | | |
|---|---|---|
| CN | 1413009 A | 4/2003 |
| JP | 7-30872 | 1/1995 |
| JP | 10-248058 | 9/1998 |
| JP | 2001-339648 | 12/2001 |
| JP | 2002-77323 | 3/2002 |
| JP | 2002-359670 | 12/2002 |
| JP | 2005-57699 | 3/2005 |
| WO | 2004/080066 A1 | 9/2004 |

OTHER PUBLICATIONS

Extended European Search Report, for corresponding European Application No. 05787623.7, dated Nov. 22, 2011, 10 pages.

* cited by examiner

| SPORTS | INCOMING CALL INDICATABILITY |
| MOVIE | INCOMING CALL INDICATABILITY |
| DRAMA | INCOMING CALL INDICATABILITY |
| NEWS | INCOMING CALL INDICATABILITY |

20

FIG. 16(a)
YOU ARE WANTED ON THE PHONE.
03-1111-2222
FIG. 16(b)
MR. HITACHI IS ON THE PHONE.
03-1111-2222
FIG. 16(c)
YOU ARE WANTED ON THE PHONE.
03-1111-2222
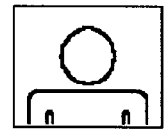
FIG. 16(d)
1/12 AM10:00 03-1111-2222
1/12 AM10:40 03-2222-3333
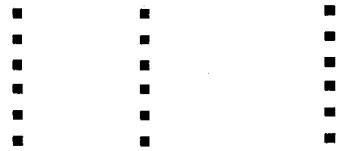
FIG. 16(e)
▶1/12 AM10:00 03-1111-2222
1/12 AM10:40 03-2222-3333
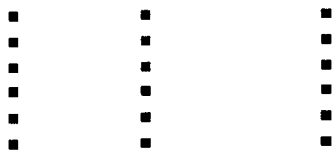

TELEPHONE DEVICE

TECHNICAL FIELD

The present invention relates to a telephone device having a television receiver portion.

BACKGROUND ART

In the digital television receiver apparatus that can be connected to the telephone line in the prior art, when a phone call comes in the receiver set while the user watches a television, either such receiver set displays a phone number of a sender on a television screen, as shown in FIG. 16(a), or such receiver set searches automatically related information such as names, nicknames, etc. on the sender phone side, which have been input in advance to correspond to the phone number of the sender, and then displays the name, the number and the name, or the like on a part of the screen, as shown in FIG. 16(b), when the receiver set senses the sender phone number. Also, as shown in FIG. 16(c), the receiver set searches automatically faces, illustrations, etc. of the senders, which have been input previously to correspond to the sender phone number as related information, and then displays an image such as a face, or the like as well as the name and the number on a part of the screen as a sub screen when the receiver set senses the sender phone number. In addition, as shown in FIG. 16(d), the receiver set can record histories of the incoming times and the sender phone numbers and then display them collectively on the screen. Further, as shown in FIG. 16(e), the receiver set can move a cursor displayed on the screen by using the remote controller of the receiver set, and dials the selected phone number by pushing the sending button, or the like provided to the remote controller (for example, Patent Literature 1).

Meanwhile, in the system that can display on the television receiver apparatus the fact that the call has come in the cellular phone, such system sends the fact that the call has come in the cellular phone to the television receiver apparatus by using a near field radio communication function, and then the television receiver apparatus side displays incoming information on a television screen by using a superimpose circuit or displays the electronic mail (for example, Patent Literature 2).

Patent Literature 1: JP-A-10-248058 (page 4, page 5, FIG. 2, FIG. 5)

Patent Literature 2: JP-A-2002-359670 (page 3, FIG. 4, FIG. 5)

DISCLOSURE OF THE INVENTION

Problems that the Invention is to Solve

However, the television receiver apparatus in the prior art has such a problem that, when phone calls come in this receiver set while the user watches a television, incoming calls of all phone calls are informed and also the television watching is suspended or interrupted. Also, this receiver set has such a drawback that, when a history of the incoming call is to be displayed, such history can be displayed only after the user's instruction is issued from the instructing portion. Also, this receiver set is at a disadvantage in that, when the user finishes watching of one television program, such user cannot automatically check the history of the incoming calls.

The present invention has been made to solve such problems, and it is an object of the present invention to provide a telephone device capable of distinguishing between the case where the incoming call is informed and the case where the incoming call is not informed, based on a sender while a user watches a television and also displaying automatically a history of incoming calls received during a watching period when the watched television program is finished after the user ends the watching of the designated televising program.

Means for Solving the Problems

In order to attain the above object, the present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; and an incoming call display control portion for executing control such that the sender information obtained from the incoming call sensing portion is compared with the phone book information when the incoming call sensing portion sensed the incoming call while the contents of the television broadcasting are displayed on the display portion, and then the contents of the television broadcasting and the sender information or the phone book information are displayed simultaneously on the display portion when the sender information coincides with the phone book information or the sender information or the phone book information is not displayed when the sender information does not coincide with the phone book information.

According to this configuration, such an effect can be achieved that when the phone call comes in from the sender except those being listed previously in the phone book portion 7 while the user watches the television, it can be prevented that the incoming call is displayed simultaneously on the television screen.

Also, the present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; and an incoming call display control portion for executing control such that incoming call indicatability information used to decide whether or not the contents of the television broadcasting and the sender information or the phone book information should be displayed simultaneously on the display portion is set every phone book information in the phone book portion when the incoming call sensing portion senses the incoming call while the contents of the television broadcasting are displayed on the display portion, then the sender information obtained from the incoming call sensing portion is compared with the phone book information when the incoming call sensing portion senses the incoming call while the contents of the television broadcasting are displayed on the display portion, and then the contents of the television broadcasting and the sender information or the phone book information are displayed simultaneously on the display portion when the sender information coincides with the phone book information and also the incoming call indicatability information is set as "yes" and the sender information or the phone book information is not displayed when the incoming call indicatability information is set as "No".

According to this configuration, such an effect can be achieved that even when the incoming call comes in from the senders listed in advance in the phone book, only the incoming call issued from the previously selected senders can be displayed and the incoming call issued from remaining senders during the user's watching of television can be prevented from being displayed simultaneously with the television screen.

Also the present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as individual groups containing at least one of the sender information as phone book information; a display portion for displaying contents of the television broadcasting received by the television receiver portion; and an incoming call display control portion for executing control such that incoming call indicatability information used to decide whether or not the contents of the television broadcasting and the sender information or the phone book information should be displayed simultaneously on the display portion is set every group in the phone book portion when the incoming call sensing portion senses the incoming call while the contents of the television broadcasting are displayed on the display portion, then the sender information obtained from the incoming call sensing portion is compared with the phone book information when the incoming call sensing portion senses the incoming call while the contents of the television broadcasting are displayed on the display portion, and then the contents of the television broadcasting and the sender information or the phone book information are displayed simultaneously on the display portion when the sender information coincides with the phone book information and also the incoming call indicatability information set to the group belonging to the phone book information is set as "yes" and the sender information or the phone book information is not displayed when the incoming call indicatability information is set as "No".

According to this configuration, such an effect can be achieved that, upon setting such a situation that the incoming call issued from only the previously selected senders should be displayed on the television screen, the senders to be designated can be classified into groups and then it can be set in unit of group whether or not the incoming call should be displayed on the television screen simultaneously with the television screen.

Also, the present invention provides a telephone device, which includes a television receiver portion for receiving a television broadcasting; a display portion for displaying contents of the television broadcasting received by the television receiver portion; a program information acquiring portion for acquiring at least a finish time of a television program; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; an incoming call history storing portion for storing a history of the sender information sensed by the incoming call sensing portion; a clock portion for acquiring a current time; and an incoming call display control portion for executing control such that the finish time of the television program is compared with the current time obtained from the clock portion and then the history of the sender information stored in the incoming call history storing portion is displayed on the display portion when the current time coincides with the finish time or the current time has passed through the finish time.

According to this configuration, such an effect can be achieved that the user can know the history of the incoming calls during the television watching immediately after the television program as the target of watching is finished.

Also, the present invention provides a telephone device, which includes a television receiver portion for receiving a television broadcasting; a program information acquiring portion for acquiring at least a type of a television program that a user is watching; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; a program-associated call acceptability storing portion for setting incoming call indicatability information, which is used to decide whether or not the sender information or the phone book information together with the contents of the television broadcasting should be displayed on the display portion, every type of the television program when the incoming call sensing portion senses the incoming call while the contents of the television broadcasting are displayed on the display portion; and an incoming call display control portion for executing control such that the sender information or the phone book information is displayed together with the contents of the television broadcasting on the display portion when the incoming call indicatability information affixed to the type of the television program obtained from the program information acquiring portion, which coincides with the type of the television program stored in the program-associated call acceptability storing portion, is set as "yes", and the sender information or the phone book information is not displayed when the incoming call indicatability information is set as "no" after the incoming call sensing portion senses the incoming call while the contents of the television broadcasting are displayed on the display portion.

According to this configuration, such an effect can be achieved that the user can set whether or not the incoming call during the watching of the television should be displayed every type of the television program or every category.

Also, the present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; and a watching presetting portion for storing incoming call indicatability information that is set every television program as a watching preset object to decide whether or not the sender information or the phone book information together with the contents of the television broadcasting should be displayed on the display portion when the incoming call sensing portion senses the incoming call while at least a start time and a finish time of a television program as the watching preset object to which watching of the television program is preset and the contents of the television broadcasting are displayed on the display portion; a clock portion for acquiring a current time; and an incoming call display control portion for executing control such that the incoming call indicatability information in the watching presetting portion is referred to decide whether or not the contents of the television broadcasting and the sender information or the phone book information should be displayed simultaneously on the display portion when the current time at which the incoming call sensing portion senses the incoming call while the contents of the television broadcasting are displayed on the display portion is located between the start time and the finish time of the watching preset object, and then the contents of the television broadcasting and the sender information or the phone book information are displayed simultaneously on the display portion when the incoming call indicatability information is set as "yes" and the sender information or the phone book information is not displayed when the incoming call indicatability information is set as "No".

According to this configuration, such an effect can be achieved that the watching presetting portion for presetting the watching of the television program at a designated time, then starting the television function unless such television function is started automatically when the set time has arrived, and then changing the channel to the preset channel can be provided to set whether or not the incoming call should be displayed during the watching of the television in unit of preset program.

Advantage of the Invention

According to the present invention, such an advantage can be achieved that, when a phone call comes in from a sender except those being listed previously in the phone book while the user watches a television, it can be prevented that the incoming call is displayed simultaneously on a television screen.

BRIEF DESCRIPTION OF THE DRAWINGS

FIG. 16 (*a*) an explanatory view of a sender phone number display of a digital broadcasting receiver device in the prior art, (*b*) an explanatory view of a sender name display of the digital broadcasting receiver device in the prior art, (*c*) an explanatory view of a sender image display of the digital broadcasting receiver device in the prior art, (*d*) an explanatory view of an incoming call history display of the digital broadcasting receiver device in the prior art, and (*e*) an explanatory view of an incoming call history cursor display of the digital broadcasting receiver device in the prior art.

Figure 1A:
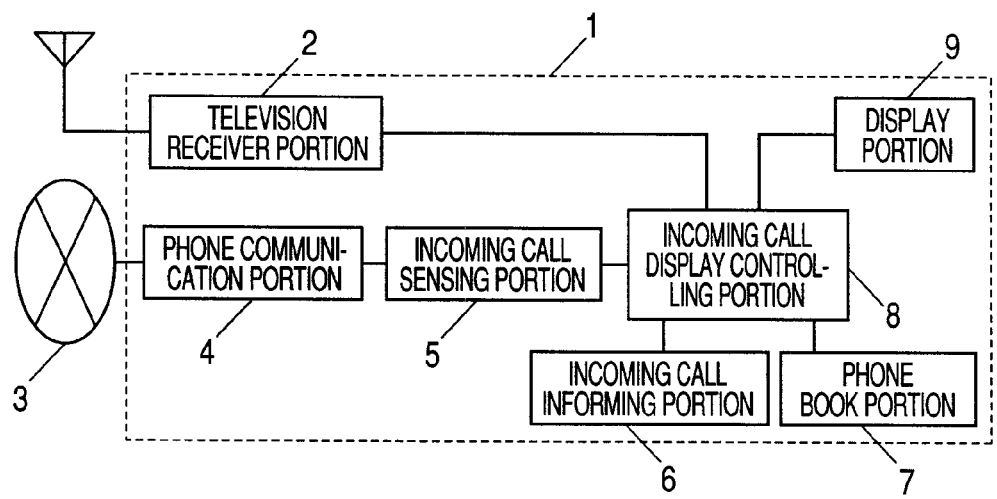
FIG. 1 (*a*) a configurative view of a telephone device of Embodiment 1 of the present invention, and (*b*) a configurative view of a phone book portion of Embodiment 1 of the present invention.

DESCRIPTION OF REFERENCE NUMERALS 2 television receiver portion
4 phone communication portion
5 incoming call sensing portion
7 phone book portion
8 incoming call display control portion
9 display portion
13 incoming call indicatability information
15 program information acquiring portion
16 incoming call history storing portion
17 clock portion
20 program-associated call acceptability storing portion
21 watching presetting portion
22 incoming call indicatability information

BEST MODE FOR CARRYING OUT THE INVENTION

The present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; and an incoming call display control portion for executing control such that the sender information obtained from the incoming call sensing portion is compared with the phone book information when the incoming call sensing portion sensed the incoming call while the contents of the television broadcasting are displayed on the display portion, and then the contents of the television broadcasting and the sender information or the phone book information are displayed simultaneously on the display portion when the sender information coincides with the phone book information or the sender information or the phone book information is not displayed when the sender information does not coincide with the phone book information.

According to this configuration, such an effect can be achieved that when the phone call comes in from the sender except those being listed previously in the phone book portion 7 while the user watches the television, it can be prevented that the incoming call is displayed simultaneously on the television screen.

Also, the present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; and an incoming call display control portion for executing control such that incoming call indicatability information used to decide whether or not the contents of the television broadcasting and the sender information or the phone book information should be displayed simultaneously on the display portion is set every phone book information in the phone book portion when the incoming call sensing portion senses the incoming call while the contents of the television broadcasting are displayed on the display portion, then the sender information obtained from the incoming call sensing portion is compared with the phone book information when the incoming call sensing portion senses the incoming call while the contents of the television broadcasting are displayed on the display portion, and then the contents of the television broadcasting and the sender information or the phone book information are displayed simultaneously on the display portion when the sender information coincides with the phone book information and also the incoming call indicatability information is set as "yes" and the sender information or the phone book information is not displayed when the incoming call indicatability information is set as "No".

According to this configuration, such an effect can be achieved that even when the incoming call comes in from the senders listed in advance in the phone book, only the incoming call issued from the previously selected senders can be displayed and the incoming call issued from remaining senders during the user's watching of television can be prevented from being displayed simultaneously with the television screen.

Also the present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as individual groups containing at least one of the sender information as phone book information; a display portion for displaying contents of the television broadcasting received by the television receiver portion; and an incoming call display control portion for executing control such that incoming call indicatability information used to decide whether or not the contents of the television broadcasting and the sender information or the phone book information should be displayed simultaneously on the display portion is set every group in the phone book portion when the incoming call sensing portion senses the incoming call while the contents of the television broadcasting are displayed on the display portion, then the sender information obtained from the incoming call sensing portion is compared with the phone book information when the incoming call sensing portion senses the incoming call while the contents of the television broadcasting are displayed on the display portion, and then the contents of the television broadcasting and the sender information or the phone book information are displayed simultaneously on the display portion when the sender information coincides with the phone book information and also the incoming call indicatability information set to the group belonging to the phone book information is set as "yes" and the sender information or the phone book information is not displayed when the incoming call indicatability information is set as "No".

According to this configuration, such an effect can be achieved that, upon setting such a situation that the incoming call issued from only the previously selected senders should be displayed on the television screen, the senders to be designated can be classified into groups and then it can be set in unit of group whether or not the incoming call should be displayed on the television screen simultaneously with the television screen.

Also, the present invention provides a telephone device, which includes a television receiver portion for receiving a television broadcasting; a display portion for displaying contents of the television broadcasting received by the television receiver portion; a program information acquiring portion for acquiring at least a finish time of a television program; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; an incoming call history storing portion for storing a history of the sender information sensed by the incoming call sensing portion; a clock portion for acquiring a current time; and an incoming call display control portion for executing control such that the finish time of the television program is compared with the current time obtained from the clock portion and then the history of the sender information stored in the incoming call history storing portion is displayed on the display portion when the current time coincides with the finish time or the current time has passed through the finish time.

According to this configuration, such an effect can be achieved that the user can know the history of the incoming calls during the television watching immediately after the television program as the target of watching is finished.

Also, the program information acquiring portion acquires at least a start time and the finish time of the television program, and the incoming call display control portion compares the finish time of the television program with the current time obtained from the clock portion and then displays the history of the sender information sensed by the incoming call sensing portion between the start time and the finish time of the television program, which are stored in the incoming call history storing portion, on the display portion when the current time coincides with the finish time or the current time has passed through the finish time.

Accordingly, the user can know the history of the incoming calls during the television watching immediately after the television program as the target of watching is finished and that the user can also narrow down the contents of the history within those provided during the watching time of a certain television program.

Also, the incoming call display control portion executes the control such that the finish time of the television program is compared with the current time obtained from the clock portion when a watching time of one television program selected by a user is continued successively to exceed a predetermined time, and then the history of the sender information sensed by the incoming call sensing portion between the start time and the finish time of the television program, which are stored in the incoming call history storing portion, is displayed on the display portion when the current time coincides with the finish time or the current time has passed through the finish time.

Accordingly, when the history of the incoming calls is displayed as soon as the television program as the target of watching is finished, the unnecessary display of the incoming call history can be prevented in a situation that the channel of the television is changed in a short time, i.e., the so-called zapping is carried out.

Also, the incoming call display control portion displays mixedly incoming calls of a phone and an electronic mail such that one of the sender information can be selected by an instruction of the user when the history of the sender information is displayed, and then executes a phone calling process based on the sender information when the incoming call of the phone is selected and defined or executes a reply process to the electronic mail based on the sender information when the incoming call of the electronic mail is selected and defined.

Accordingly, when the history of the incoming calls is displayed, the reply operation can be easily made to the incoming call of the phone call or the electronic mail issued from the desired sender person.

Also, the present invention provides a telephone device, which includes a television receiver portion for receiving a television broadcasting; a program information acquiring portion for acquiring at least a type of a television program that a user is watching; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; a program-associated call acceptability storing portion for setting incoming call indicatability information, which is used to decide whether or not the sender information or the phone book information together with the contents of the television broadcasting should be displayed on the display portion, every type of the television program when the incoming call sensing portion senses the incoming call while the contents of the television broadcasting are displayed on the display portion; and an incoming call display control portion for executing control such that the sender information or the phone book information is displayed together with the contents of the television broadcasting on the display portion when the incoming call indicatability information affixed to the type of the television program obtained from the program information acquiring portion, which coincides with the type of the television program stored in the program-associated call acceptability storing portion, is set as "yes", and the sender information or the phone book information is not displayed when the incoming call indicatability information is set as "no" after the incoming call sensing portion senses the incoming call while the contents of the television broadcasting are displayed on the display portion.

According to this configuration, such an effect can be achieved that the user can set whether or not the incoming call during the watching of the television should be displayed every type of the television program or every category.

Also, the program information acquiring portion acquires at least a name of the television program, and executes control to specify the type of the television program based on the name of the television program.

Accordingly, even when the type information of the television program, i.e., the so-called category information cannot be acquired, the category can be specified based on the television program name and then the user can set whether or not the incoming call during the watching of the television should be displayed every type of the television program or every category.

Also, the present invention provides a telephone device, which includes a television receiver portion for receiving a television broadcasting; a telephone communication portion for holding a telephone communication; an incoming call sensing portion for sensing an incoming call of a phone and sensing sender information obtained upon incoming of a call via the telephone communication portion to specify a sender; a phone book portion for storing previously the sender information used to specify the sender as phone book information; a display portion for displaying contents of the television broadcasting received by the television receiver portion; and a watching presetting portion for storing incoming call indicatability information that is set every television program as a watching preset object to decide whether or not the sender information or the phone book information together with the contents of the television broadcasting should be displayed on the display portion when the incoming call sensing portion senses the incoming call while at least a start time and a finish time of a television program as the watching preset object to which watching of the television program is preset and the contents of the television broadcasting are displayed on the display portion; a clock portion for acquiring a current time; and an incoming call display control portion for executing control such that the incoming call indicatability information in the watching presetting portion is referred to decide whether or not the contents of the television broadcasting and the sender information or the phone book information should be displayed simultaneously on the display portion when the current time at which the incoming call sensing portion senses the incoming call while the contents of the television broadcasting are displayed on the display portion is located between the start time and the finish time of the watching preset object, and then the contents of the television broadcasting and the sender information or the phone book information are displayed simultaneously on the display portion when the incoming call indicatability information is set as "yes" and the sender information or the phone book information is not displayed when the incoming call indicatability information is set as "No".

According to this configuration, such an effect can be achieved that the watching presetting portion for presetting the watching of the television program at a designated time, then starting the television function unless such television function is started automatically when the set time has arrived, and then changing the channel to the preset channel can be provided to set whether or not the incoming call should be displayed during the watching of the television in unit of preset program.

Also, in case the sender information or the phone book information to be displayed is obtained based on the incoming call of an electronic mail, the incoming call display control portion executes control such that predetermined several characters from a head of a text of the electronic mail are displayed in addition to the sender information or the phone book information of the electronic mail when it is decided based on the incoming call indicatability information that the contents of the television broadcasting and the sender information or the phone book information should be displayed simultaneously on the display portion.

Accordingly, when the incoming call of the electronic mail comes in while the user watches the television, the user can check the contents of the electronic mail at a point of time of arrival by displaying the contents of the electronic mail simultaneously with the television screen while reducing the influence on the display of the television screen as small as possible.

Also, the incoming call display control portion has an electronic mail reply instructing portion for executing control such that, in case the sender information or the phone book information to be displayed is obtained based on the incoming call of an electronic mail, a reply process to the electronic mail corresponding to the sender information or the phone book information is executed based on an instruction of the user while the sender information or the phone book information is displayed.

Accordingly, when the incoming call of the electronic mail is displayed simultaneously with the television screen while the user watches the television, the user can execute instantly the replay process to the electronic mail as the case may be.

EMBODIMENT 1

A telephone device of Embodiment 1 of the present invention will be explained with reference to the drawings hereinafter.

FIG. 1(a) is a configurative view of a telephone device of Embodiment 1. A main body 1 of the telephone device includes a television receiver portion 2 for receiving the analog signal or the digital signal of the television broadcasting via cable or radio; a phone communication portion 4 connected to the analog or digital public telephone line 3 containing the circuit connection and the circuit sharing (packet communication, IP (Internet Protocol) communication network) via cable or radio to send/receive the phone conversation, the electronic mail, and the like; an incoming call sensing portion 5 for sensing an incoming phone call or an incoming electronic mail and sensing sender information, e.g., phone number, electronic mail address, IP address, character code indicating the name of the sender, character codes, etc. obtained via the phone communication portion 4 to identify the sender; an incoming call informing portion 6 for informing the user of the incoming call by using a light emitted from LED (Light Emitting Diode), or the like, an audio or a sound generated from a speaker, an earphone, a headphone, or the like via cable or radio, and a vibration generated by a motor, a piezoelectric oscillator, or the like when the incoming call is sensed by the incoming call sensing portion 5; a phone book portion 7 for storing sender information previously as phone book information; and an incoming call display controlling portion 8 for causing a display portion 9 constructed by a liquid crystal, EL (ElectroLuminescence), or the like to display the contents of the television broadcasting, and comparing the sender information from the incoming call sensing portion 5 with the phone book information during display when the incoming call sensing portion 5 senses the incoming call, and then executing control in such a way that the contents of the television broadcasting and the sender information or the phone book information are displayed simultaneously on the display portion 9 when the sender information coincides with the phone book information whereas the sender information or the phone book information is not displayed when the sender information does not coincide with the phone book information.

Figure 1B:
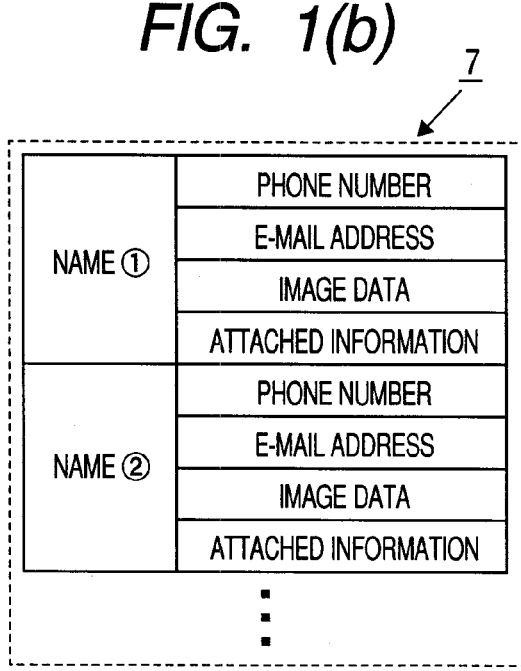

FIG. 1(b) is a memory block diagram showing the contents of the phone book portion 7. The names of persons, the names of companies, etc., which are to be registered, are listed in the phone book portion 7. Also, related information such as phone number, electronic mail address, image data such as a photograph of a face, or the like, IP address, and others corresponding to the above names, etc. can be stored.

Figure 2:
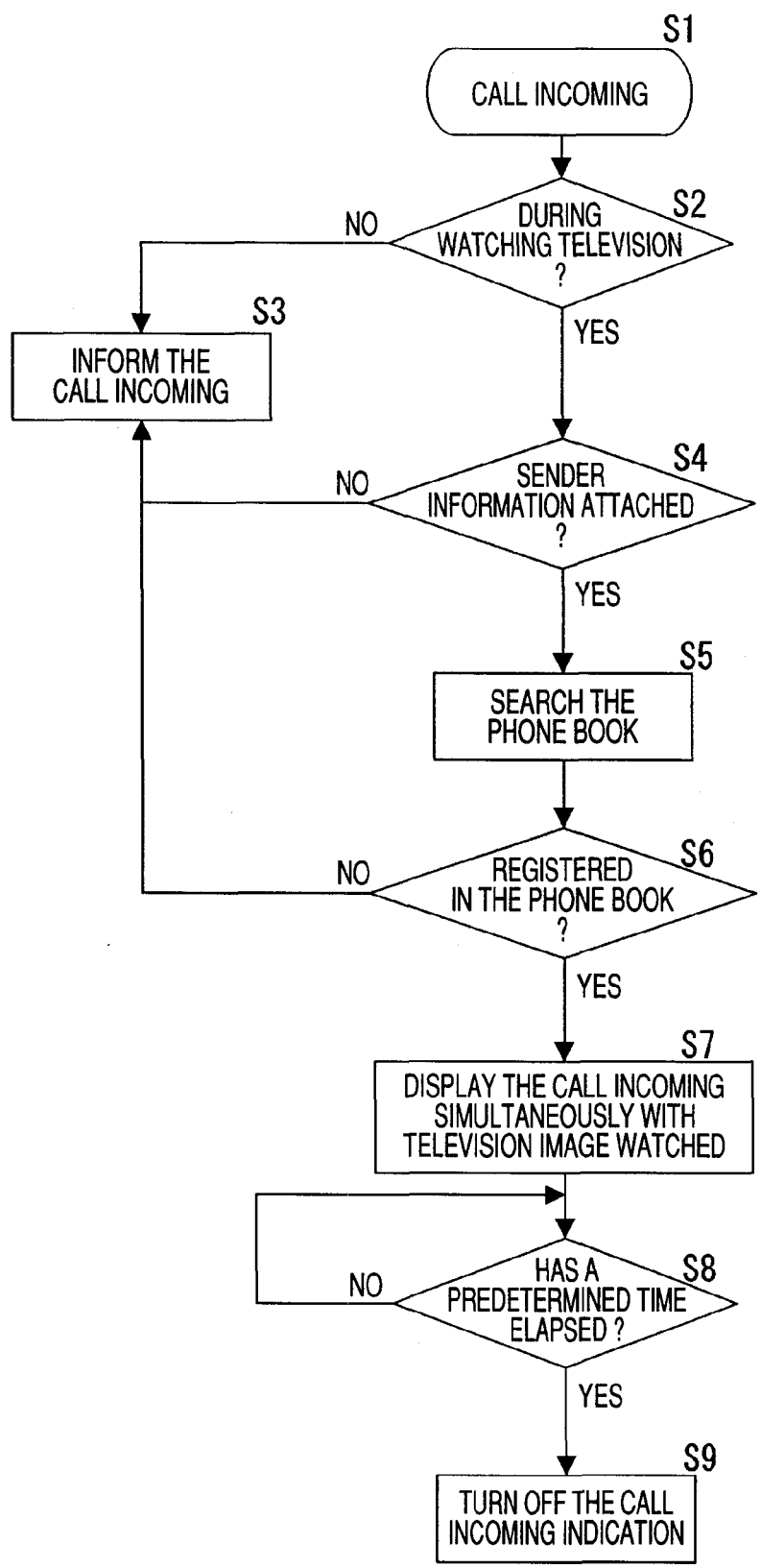
FIG. 2 A flowchart showing an operation of the telephone device of Embodiment 1 of the present invention.

A flowchart showing an operation flow of the telephone device of Embodiment 1 of the present invention is shown in FIG. 2. When the incoming call sensing portion 5 senses the incoming call (S1), the incoming call display controlling portion 8 decides whether or not the user is watching the television (S2). If it is not decided that the user is watching the television (No in S2), the incoming call informing portion 6 informs the user of the incoming call by using a lightening or flashing of a light, an audio or a sound generated from a speaker, an earphone, a headphone, or the like via cable or radio, and a vibration generated by a vibration element such as a motor, or the like (S3). If it is decided that the user is watching the television (Yes in S2), the same operation as that in S3 is taken in a case that the sender information is not attached to the incoming call, e.g., in the case of the phone call, the sender sets the phone not to send the sender information such as sender's own phone number, or the like (No in S4). If the sender information is attached to the incoming call (Yes in S4), the incoming call display controlling portion 8 searches the sender information such as phone number, electronic mail address, IP address, etc. listed in the phone book portion 7, based on the sent sender information (S5), and decides whether or not the sender information is listed in the phone book portion 7 (S6). If the sender information is not listed in the phone book portion (No in S6), the same operation as that in S3 is taken. In this event, a sub display portion may be provided to the incoming call informing portion 6 by a displaying unit such as a liquid crystal, or the like different from the display portion 9, and then the sender information such as phone number, electronic mail address, IP address, etc. of the sender and attached information such as name, image, etc. of the sender as the phone book information may be displayed on this sub display portion. Also, the sub display portion may be constructed to display the information at any time irrespective of the decision in S2.

Also, the incoming call informing portion 6 may be used as a communication unit to send to other devices the effect that the incoming call has been received. At that time, the sender information such as phone number, electronic mail address, IP address, etc. of the sender and attached information such as name, image, etc. of the sender as the phone book information may be superposed and sent. Then, if the sender information is listed in the phone book portion 7 (Yes in S6), the incoming call display controlling portion 8 causes the display portion 9 to display the incoming call based on the sender information or the phone book information corresponding to the sender information together with watching television screen (S7).

Figure 3A:
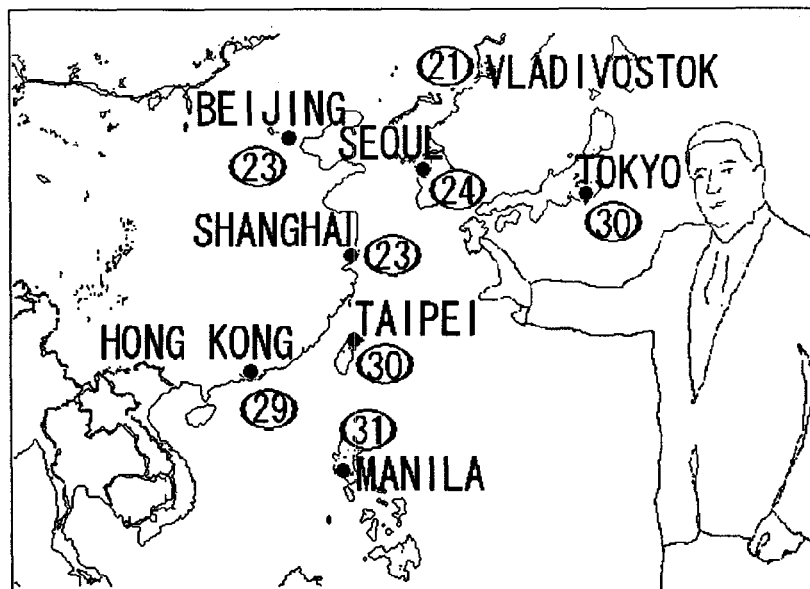
FIG. 3 (*a*) an explanatory view of a television screen displayed on a display portion of Embodiment 1 of the present invention, and (*b*) an explanatory view of an incoming call display displayed on the display portion of Embodiment 1 of the present invention.
Figure 3B:

FIG. 3 shows an example of display modes, wherein FIG. 3(*a*) shows a television screen 10 displayed on the display portion 9 and FIG. 3(*b*) shows a display state when the incoming call is displayed in S7. In this example, the incoming call as well as the phone number of the sender and the sender name stored as the phone book information is displayed in an incoming call display window 11.

Here, the television screen mentioned in the present invention contains displays of not only a motion picture and a still picture received by the television receiver portion 2 but also text data and image data such as the data broadcasting.

Also, as the simultaneous display mode of the television screen and the incoming call display window 11 on the display portion 9, the semitransparent display (the display in which a luminance of the television screen is lowered in an area of the television screen that overlaps with the incoming call display window 11, and then the incoming call display window 11 is superposed there such that the television screen can be transmitted) may be employed in addition to the superposition. Alternately, the incoming call display window 11 can be displayed simultaneously with the television screen on the display portion 9 by reducing the television screen in the vertical direction, the horizontal direction, or the diagonal direction such that the incoming call display window 11 and the television screen do not overlap with each other. Also, the area of the incoming call display window 11 is not partitioned and character information, icon, image information can be displayed on the television screen by using the superimpose.

In addition, when the number of displayed characters is large, the display for moving characters such as sender name, electronic mail address, title of the electronic mail, and the like, i.e., scrolling display can be employed. When this incoming call is the electronic mail, any of the electronic mail address and the names, the subjects, etc. listed as the phone book information can be displayed in combination. Also, predetermined several characters (containing the setting made by the user) from the head of the text of the electronic mail can be displayed.

Then, as the timing to turn off such display of the incoming call display window 11, the incoming call display controlling portion 8 decides whether or not a predetermined time (containing the setting made by the user) has elapsed (S8). If the incoming call display window 11 is displayed for the predetermined time (Yes in S8), the incoming call display controlling portion 8 turns off the call incoming indication (S9). Then, the television screen returns the former display (as shown in FIG. 3(*a*)). Here, in case the user does not wish to wait a lapse of a predetermined time, such a configuration may be employed that the indication is turned off when the user issued the instruction, e.g., the user pushed down the button, or the like to check that the call incoming indication has been given.

Here, the notice of the incoming call in above S3, i.e., the incoming call to which the sender information is not attached can be omitted. In this case, when the incoming call comes in from the sender who is not listed in the phone book portion 7 while the user is viewing a television, the user is not informed of the incoming call.

In the telephone device of Embodiment 1 of the present invention constructed as above, such advantages can be achieved that, when the phone call comes in from the sender except those being listed previously in the phone book portion 7 while the user watches the television, it can be prevented that the incoming call is displayed simultaneously on the television screen and thus the user can be concentrate on the watching of the television and also the incoming call from the already-known sender can be displayed simultaneously on the television screen because the sender listed previously in the phone book portion 7 is the already-known sender.

Also, such an advantage can be achieved that, when the incoming call of the electronic mail comes in while the user watches the television, the user can check the contents of the electronic mail at a point of time of arrival by displaying the contents of the electronic mail simultaneously with the television screen while reducing the influence on the display of the television screen as small as possible.

EMBODIMENT 2

A telephone device of Embodiment 2 of the present invention will be explained with reference to the drawings hereinafter.

Figures 4A, 4B:
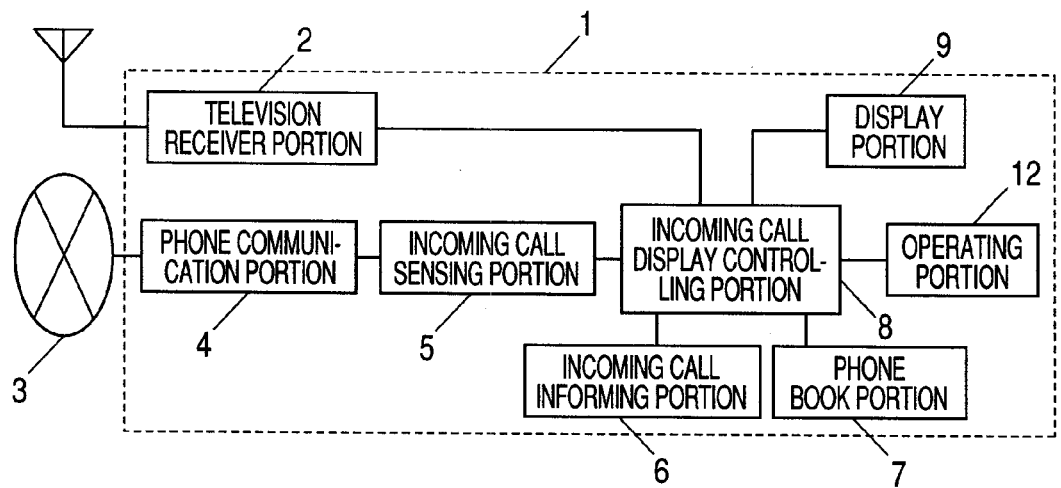
FIG. 4 (*a*) a configurative view of a telephone device of Embodiment 2 of the present invention, and (*b*) a configurative view of a phone book portion of Embodiment 2 of the present invention.

FIG. 4(*a*) is a configurative view of a telephone device of Embodiment 2 of the present invention. (The same reference symbols are affixed to the portions with the same configurations as those in Embodiment 1, and their explanation will be omitted herein.)

In the telephone device in FIG. 4, a difference from Embodiment 1 resides in that an incoming call indicatability information 13 is added to the phone book portion 7 every person of the phone book information and an operating portion 12 is provided to set the incoming call indicatability information 13. The incoming call indicatability information 13 being set in the phone book portion 7 can be set by the user using the operating portion 12 every registered person listed in the phone book portion 7 or every sender information such as phone number, electronic mail address, or the like used to identify the sender. For example, 1 bit is assigned to this information, and "1" denotes such a state that the display of the incoming call is "allowed" when the incoming call comes in from the concerned sender or the sender who agrees with the sender information while the user watches the television whereas "0" denotes such a state that the display of the incoming call is "inhibited" in the same situation.

Figure 5:
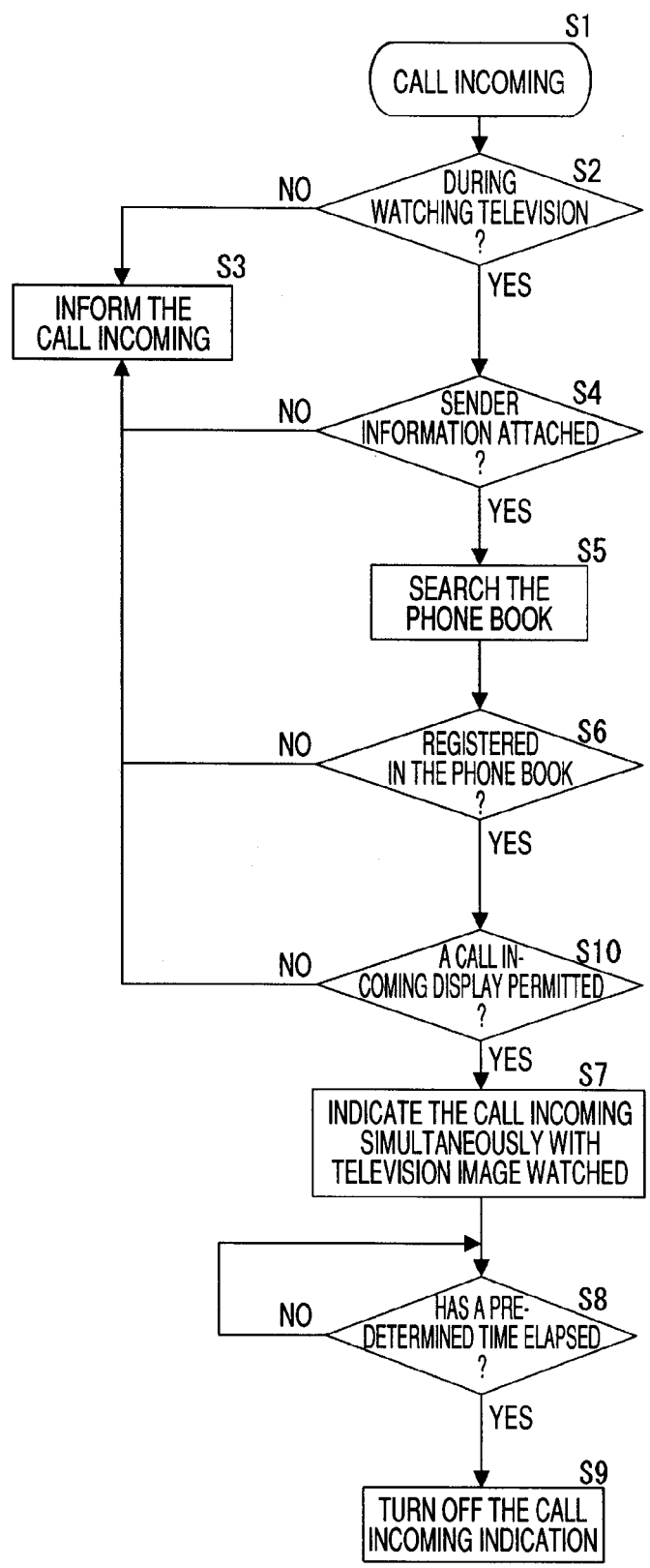
FIG. 5 A flowchart showing an operation of the telephone device of Embodiment 2 of the present invention.

A flowchart showing an operation flow of the telephone device of Embodiment 2 of the present invention is shown in FIG. 5.

In the flowchart showing an operation flow of the telephone device in FIG. 5, a difference from Embodiment 1 resides in that step of checking contents of the incoming call indicatability information 13 (S10) is added after it is decided that the corresponding sender information is listed in the phone book portion 7 (Yes in S6). If the incoming call indicatability information 13 is set to "No: 0" (No in S10), the incoming call informing process similar to that in Embodiment 1 (S3) is executed. In contrast, if the incoming call indicatability information 13 is set to "Yes: 1" (Yes in S10), the incoming call displaying process similar to that in Embodiment 1 (S7) is executed.

In the telephone device of Embodiment 2 of the present invention constructed as above, such advantages can be achieved that, even when the incoming call comes in from the senders listed in advance in the phone book, only the incoming call issued from the previously selected senders can be displayed and the incoming call issued from remaining senders during the user's watching of television can be prevented from being displayed simultaneously with the television screen.

EMBODIMENT 3

A telephone device of Embodiment 3 of the present invention will be explained with reference to the drawings hereinafter.

Figure 6:
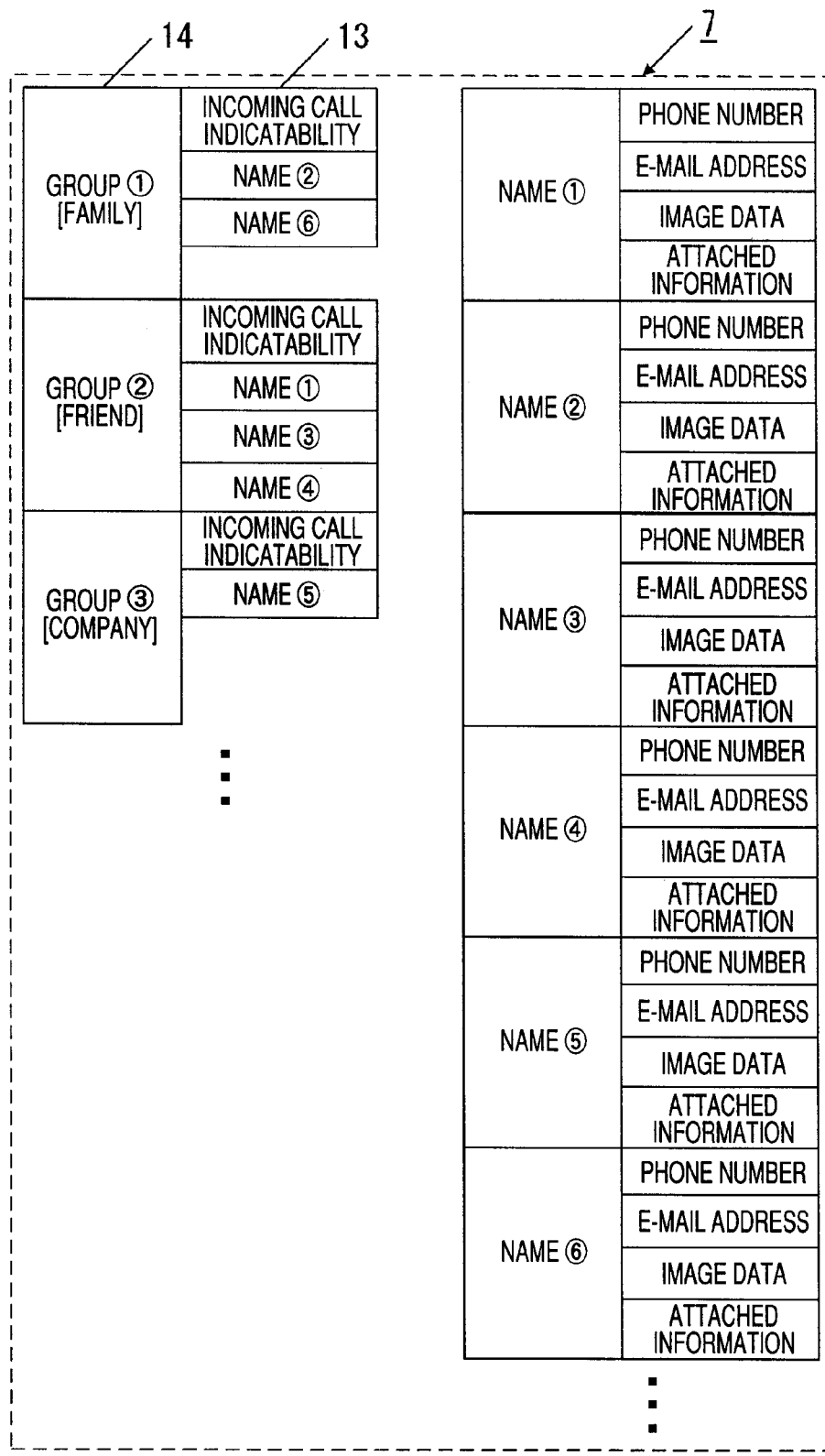
FIG. 6 A configurative view of a phone book portion of Embodiment 3 of the present invention.

FIG. 6 is a memory block diagram of the phone book portion 7 of Embodiment 3. (The same reference symbols are affixed to the portions with the same configurations as those in Embodiment 2, and their explanation will be omitted herein.)

In the telephone device in FIG. 6, a difference from Embodiment 2 resides in that the sender information used to identify the sender are stored previously as the phone book information in the phone book portion 7 as groups 14 containing at least one of individual sender information and also the incoming call indicatability information 13 used to set whether or not the incoming call can be displayed during the user's watching of television is set in unit of this group.

A flowchart showing an operation flow of the telephone device of Embodiment 3 is similar to that explained in Embodiment 2 in FIG. 5. A difference is step of checking the contents of the incoming call indicatability information 13 (S10). If the incoming call indicatability information 13 set in the group 14 is set to "No" (No in S10), the incoming call informing process similar to that in Embodiment 1 or 2 (S3) is executed. In contrast, if the incoming call indicatability information 13 is set to "Yes" (Yes in S10), the incoming call displaying process similar to that in Embodiment 1 or 2 (S7) is executed.

Here, as to the units lumped together into a group, all phone numbers in the phone book portion 7 are gathered into one group and also all electronic mail addresses are gathered into one group, and then the incoming call indicatability information can be attached to respective groups. With such arrangement, it can be set whether or not the incoming call should be displayed when a phone call comes in while the user watches a television and also it can be set whether or not the incoming call should be displayed when an electronic mail comes in while the user watches a television. For example, such a configuration can be employed that, when the electronic mail comes in, the display of the incoming call based on the sender information or the phone book information corresponding to this sender information is given on the display portion simultaneously with the television screen that the user is watching and, when the phone call comes in, the display of the incoming call is not given on the display portion.

Also, in addition to the classification by the grouping, respective sender information are ranked in response to the degree of importance of the sender to be received, and then the incoming call indicatability decided when the incoming call comes in during the user's watching of television can be set every ranking.

In the telephone device of Embodiment 3 of the present invention constructed as above, such advantages can be achieved that, upon setting such a situation that the incoming call issued from only the previously selected senders should be displayed on the television screen, the senders to be designated can be classified into groups and then it can be set in unit of group whether or not the incoming call should be displayed on the television screen simultaneously with the television screen.

EMBODIMENT 4

A telephone device of Embodiment 4 of the present invention will be explained with reference to the drawings hereinafter.

Figure 7:
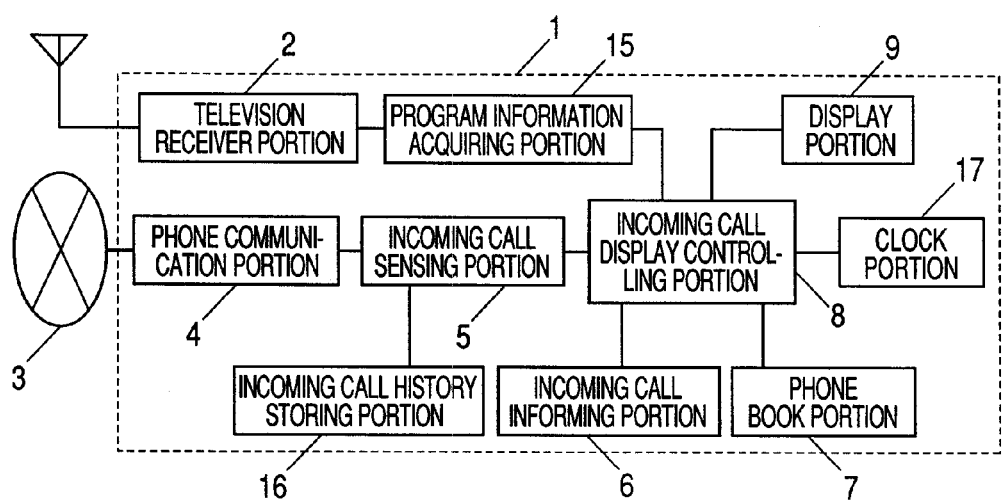
FIG. 7 A configurative view of a telephone device of Embodiment 4 of the present invention.

FIG. 7 is a configurative view of a telephone device of Embodiment 4. (The same reference symbols are affixed to the portions with the same configurations as those in Embodiments 1 to 3, and their explanation will be omitted herein.)

In the telephone device shown in FIG. 7, a difference from Embodiments 1 to 3 resides in that a program information acquiring portion 15 for acquiring the information about the television program to be received is provided. The program information consist of program name, broadcasting channel, broadcasting date, broadcasting start time, broadcasting finish time, program type, outline explanation of the program, and the like, for example, and also contain EPG (Electric Program Guide) information, for example. These program information contain information derived from the data that are superposed on the signal received by the television receiver portion 2, information derived by a communicating unit such as the Internet, or the like provided separately via cable or radio, information obtained by IrDA or RF-ID, information input by the user, and information acquired by picking up an image of a representation of the bar code by an imaging unit such as the camera and then decoding the image. Also, an incoming call history storing portion 16 for storing a history of the sender information obtained by the incoming call sensing portion 5 at a time of call incoming is newly provided. As the sender information stored here, a call incoming time obtained from a clock portion 17 that holds a current time is stored together with the sender information. In this case, a method by which the clock portion 17 acquires a current time can be accomplished by not only using its own function of counting a current time as a clock but also acquiring a current time from the GPS (Global Positioning System) satellite, the network such as the Internet, or the like, the airwave of a standard time, the base station of the cellular phone, and the like.

Figure 8:
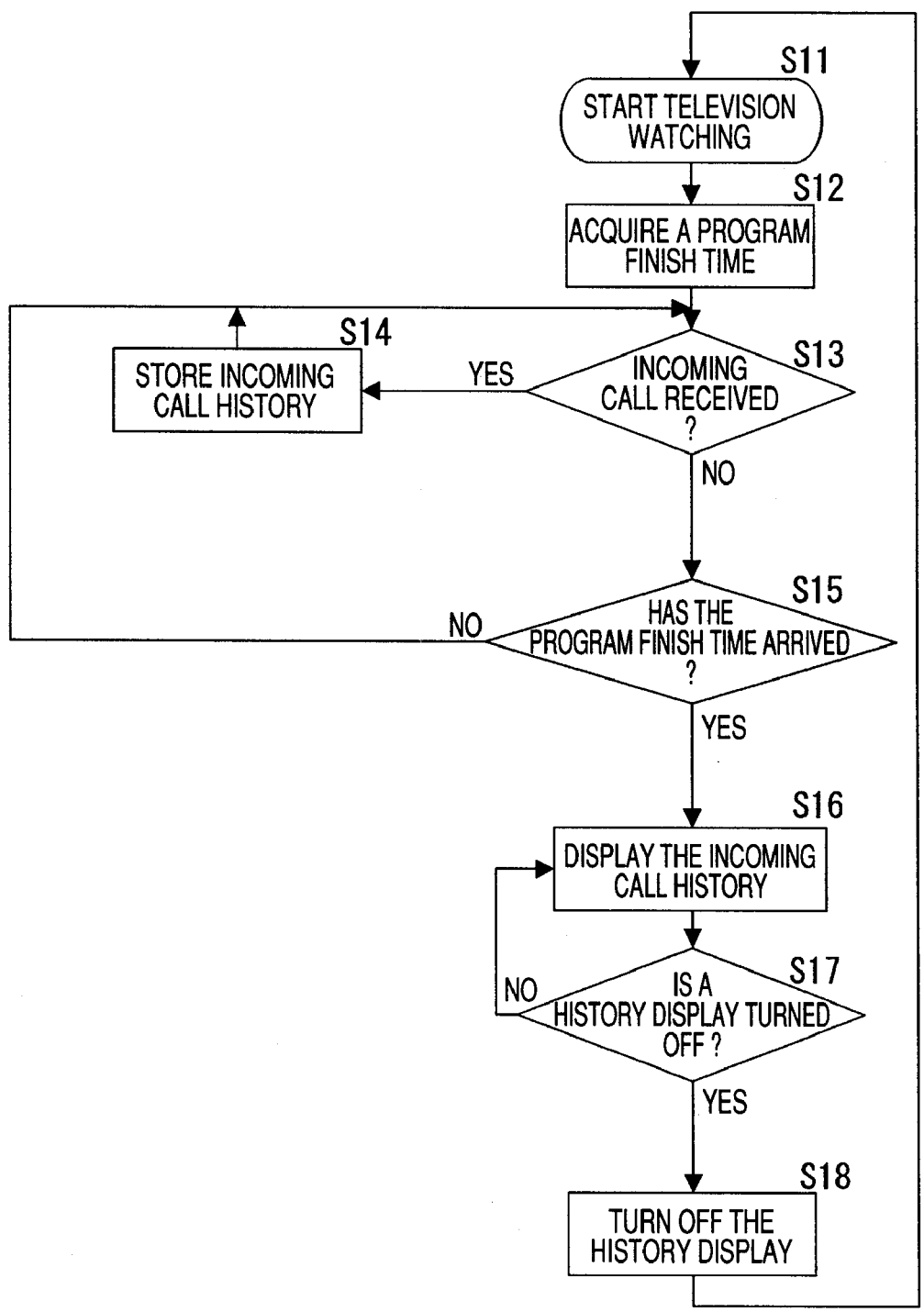
FIG. 8 A flowchart showing an operation of the telephone device of Embodiment 4 of the present invention.

A flowchart showing an operation of the telephone device of Embodiment 4 of the present invention is shown in FIG. 8. The user starts the watching of television by turning on the television receiver portion 2 (S11), the program information acquiring portion 15 acquires a finish time, which is superposed on the television broadcasting, of the television program that the user watches currently (S12). The method for acquiring a finish time of the television program is not limited to this, and various acquiring methods are present as described above. Then, if the incoming call has received (Yes in S13), a current time obtained from the clock portion and the sender information obtained from the incoming call sensing portion 5 are stored in the incoming call history storing portion 16 (S14). Here, the sender information to be recorded, i.e., incoming call history can be constructed to include the information obtained before the user's watching of the television is started. At this time, the notice of the incoming call made by the incoming call informing portion 6 can be stopped from the start time of the television program being watched to the finish time or cannot be stopped. Then, the incoming call display controlling portion 8 compares a current time from the clock portion 17 with a finish time, which is acquired by the program information acquiring portion 15, of the television program that the user watches currently, to decide whether or not the finish time of the program has arrived (S15). If it is decided that the current time coincides with the finish time or the current time has passed through the finish time (Yes in S15), the incoming call display controlling portion 8 causes the display portion 9 to display the incoming call history stored in incoming call history storing portion 16 (S16).

Here, it is possible to inform simultaneously the user that such history is displayed, by using a light emitted from LED, or the like, an audio or a sound generated from a speaker, or the like, or a vibration generated by a motor, a piezoelectric oscillator, or the like.

Figures 9A, 9B:
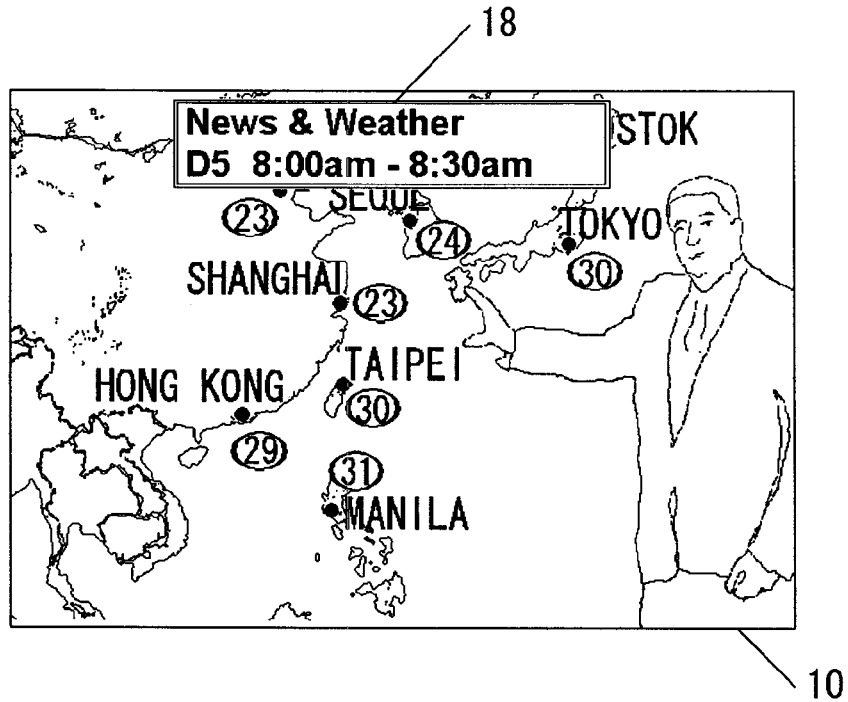
FIG. 9 (*a*) an explanatory view of a program information display displayed on a display portion of Embodiment 4 of the present invention, and (*b*) an explanatory view of an incoming call history display displayed on the display portion of Embodiment 4 of the present invention.

FIG. 9 shows an example of the display modes. FIG. 9(*a*) is a television screen 10 displayed on the display portion 9, and program information is displayed on a program information display window 18 to superpose on the television screen. FIG. 9(*b*) shows a state that the incoming call history is displayed in S16. In this example, the incoming calls of the phone call and the electronic mail are mixed in time series on the display. The incoming calls of the phone call and the electronic mail can be displayed on the display. Also, the incoming call history may be displayed after the television screen is turned off, or the incoming call history may be displayed to superpose on the television screen that is not turned off. In addition, the semitransparent display (the display in which a luminance of the television screen is lowered in an area of the television screen that overlaps with an incoming call history display window 19, and then the incoming call history display window 19 is superposed there such that the television screen can be transmitted) may be employed. Alternately, the incoming call history display window 19 can be displayed simultaneously with the television screen on the display portion 9 by reducing the television screen in the vertical direction, the horizontal direction, or the diagonal direction such that the incoming call history display window 19 and the television screen do not overlap with each other. Also, the area of the incoming call history display window 19 is not partitioned and character information can be displayed on the television screen by using the superimpose.

Figure 10A:
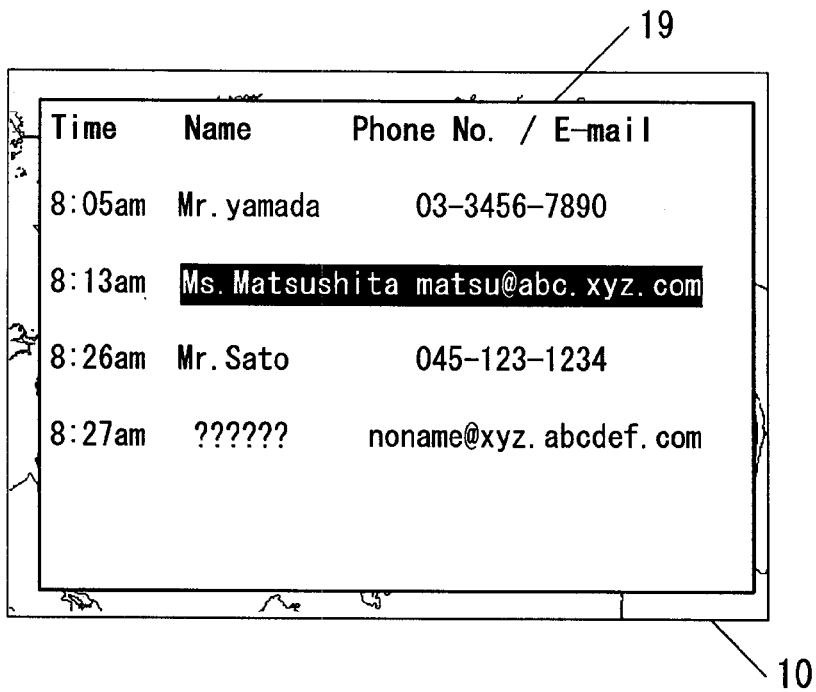
FIG. 10 (*a*) an explanatory view of an electronic mail history selection displayed on the display portion of Embodiment 4 of the present invention, and (*b*) an explanatory view of an incoming phone call history selection displayed on the display portion of Embodiment 4 of the present invention.
Figure 10B:
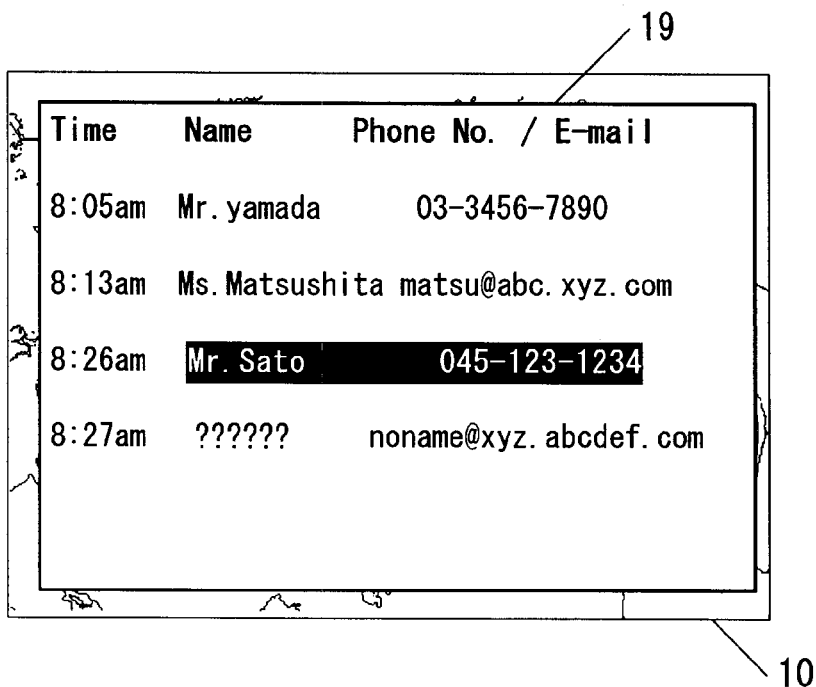

Also, such a configuration may be employed that, as shown in FIG. 10(*a*), the sender information of the incoming call history are displayed selectively, then a cursor is moved onto the sender information of the phone number, the electronic mail address, or the like as one of the incoming call history by pushing a button, or the like, and then the incoming call display controlling portion 8 is controlled to execute either the calling operation to this phone number when the incoming call of the phone number is selected as desired sender information and then defined by pushing a button, or the like or the reply process to the electronic mail when the incoming call of the electronic mail is selected, as shown in FIG. 10(*b*).

In this case, the incoming call history displayed in S16 can be limited to the incoming call histories that occurred from the start time of the watched program to the finish time after the program disclosure time is acquired by the program information acquiring portion 15.

Also, as the condition imposed to shift from step S11 to step S12, such a condition is needed that a watching time of a certain television program selected by the user is continued successively to exceed a predetermined time (containing a set time by the user). In other words, when the channel is changed within a shorter time than the predetermined time or when a shorter time than the predetermined time has elapsed merely after the channel is changed, the incoming call history may not be displayed even if the program finish time has arrived.

Also, when the incoming call history displayed when the finish time of the program has arrived is not displayed on the display portion 9, such incoming call history can be displayed on the sub display portion constructed by a liquid crystal, EL, or the like except the display portion 9.

In the telephone device of Embodiment 4 of the present invention constructed as above, such advantages can be achieved that the user can know the history of the incoming calls during the television watching immediately after the television program as the target of watching is finished. Also, such advantages can be achieved that the user can know the history of the incoming calls during the television watching immediately after the television program as the target of watching is finished and that the user can also narrow down the contents of the history within those provided during the watching time of a certain television program. Also, such advantages can be achieved that, when the history of the incoming calls is displayed as soon as the television program as the target of watching is finished, the unnecessary display of the incoming call history can be prevented in a situation that the channel of the television is changed in a short time, i.e., the so-called zapping is carried out. Also, such advantages can be achieved that, when the history of the incoming calls is displayed, the reply operation can be easily made to the incoming call of the phone call or the electronic mail issued from the desired sender person.

EMBODIMENT 5

A telephone device of Embodiment 5 of the present invention will be explained with reference to the drawings hereinafter.

Figures 11A, 11B:
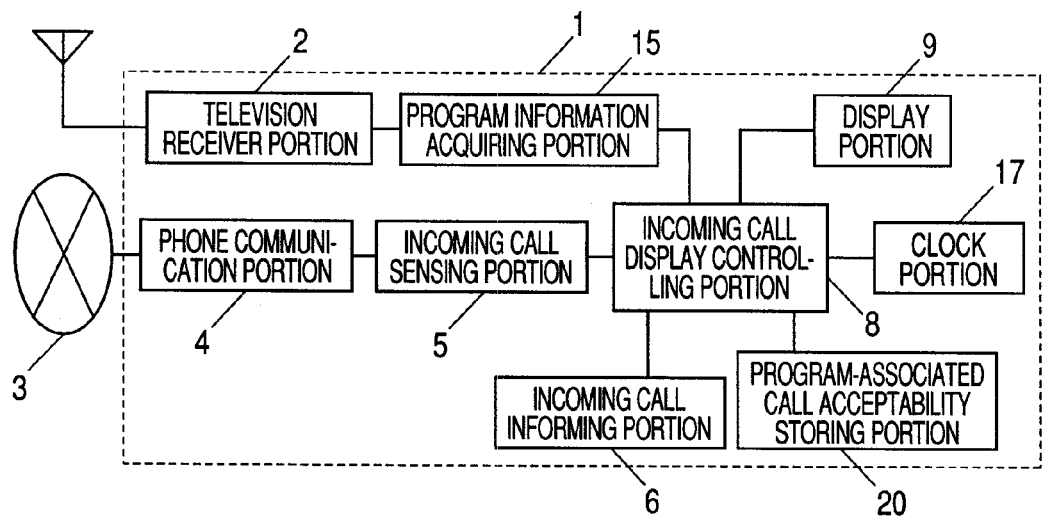
FIG. 11 (*a*) a configurative view of a telephone device of Embodiment 5 of the present invention, and (*b*) a configurative view of a phone book portion of Embodiment 5 of the present invention.

FIG. 11(*a*) is a configurative view of a telephone device of Embodiment 5. (The same reference symbols are affixed to the portions with the same configurations as those in Embodiments 1 to 4, and their explanation will be omitted herein.)

In the telephone device shown in FIG. 11(*a*), a difference from Embodiments 1 to 4 resides in that a program-associated call acceptability storing portion 20 for storing the decision as to whether or not the incoming call should be informed every type of the television program is provided.

FIG. 11(*b*) shows a memory block of the program-associated call acceptability storing portion 20 that sets and stores whether or not the incoming call occurred during the user's watching of television should be displayed every type of the program obtained from the program information acquiring portion 15, i.e., every category. For example, 1 bit is assigned to this information, and "1" denotes such a state that the display of the incoming call is "allowed" when the incoming call comes in from the concerned sender or the sender who agrees with the sender information while the user watches the television whereas "0" denotes such a state that the display of the incoming call is "inhibited" in the same situation.

Figure 12:
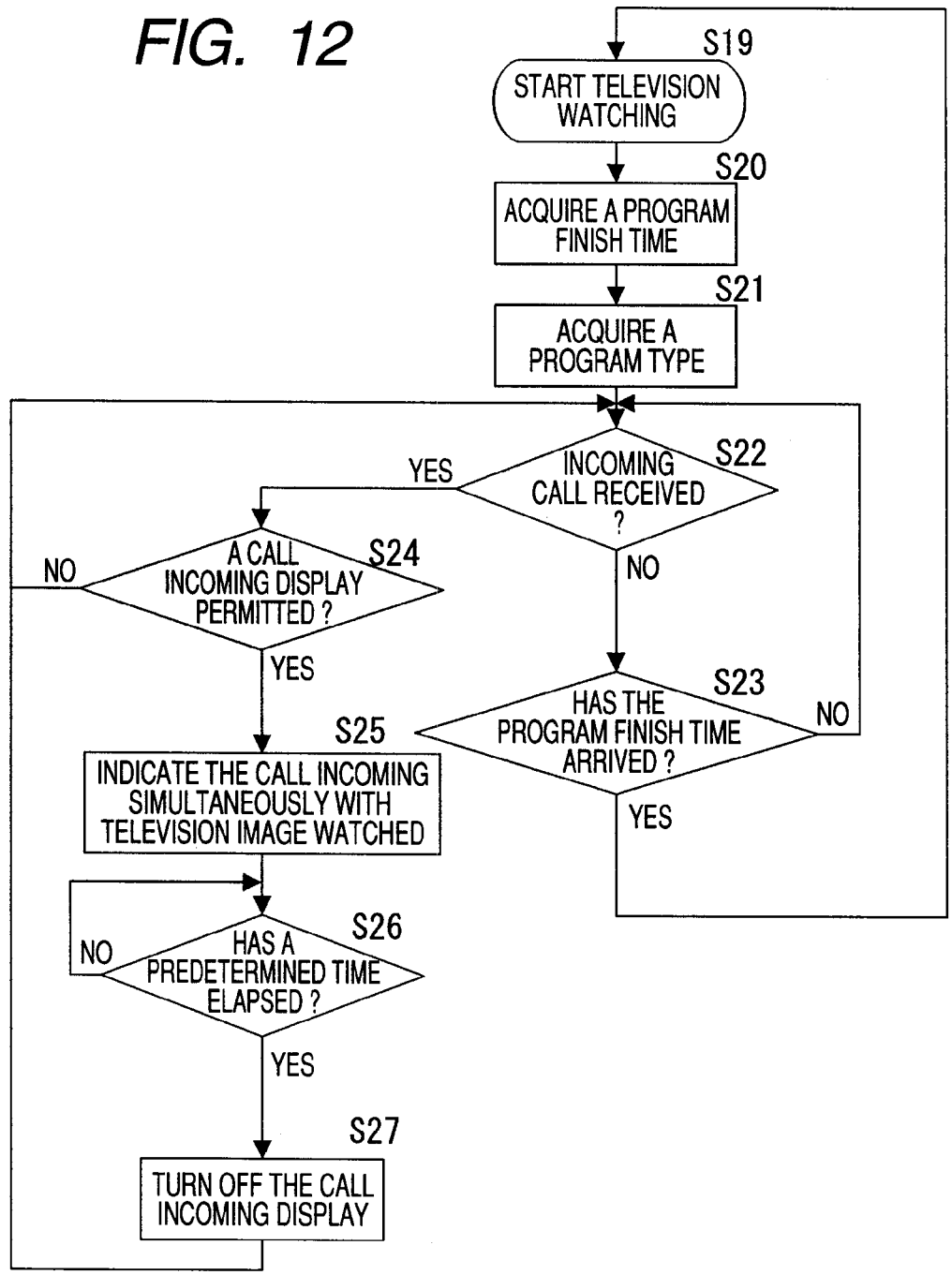
FIG. 12 A flowchart showing an operation of the telephone device of Embodiment 5 of the present invention.

FIG. 12 shows a flowchart showing an operation flow of the telephone device of Embodiment 5 of the present invention. When the user starts the watching of the television by turning on the television receiver portion 2 (S19), the program information acquiring portion 15 acquires a finish time, which is superposed on the television broadcasting, of the television program that the user watches now (S20). Then, the program information acquiring portion 15 acquires program type information of the television program that the user watches now, i.e., so-called category information (S21). Then, the incoming call sensing portion 5 senses whether or not the incoming call has been received (S22). If the incoming call has not been received (No in S22), the incoming call display controlling portion 8 decides whether or not the program finish time has arrived (S23). If the program finish time has arrived (Yes in S23), the process goes back to the television watching starting state again (S19). In contrast, if the incoming call has been received (Yes in S22), the incoming call display controlling portion 8 compares the program type information of the television program, which the user watches at present, obtained from the program information acquiring portion 15 with the program type information stored in the program-associated call acceptability storing portion 20 and then refers to the incoming call indicatability information being set to such program type when the hit program type can be searched (S24). Then, if the call incoming display is "permitted" (Yes in S24), the call incoming display explained in S7 in Embodiment 1 is executed (S25). In contrast, if the call incoming display is "inhibited" (No in S24), the incoming call is waited once again.

The similar processes to those explained in S8, S9 of FIG. 2 in Embodiment 1 are applied to get a timing at which the incoming call display is turned off.

Sometimes the program information acquiring portion 15 cannot acquire the program type information of the television program that the user watches now. For that purpose, comparing information used to identify the program type from the program name can be held in the program information acquiring portion 15. As examples of comparing information, the information containing "cinema", "screen", or "roadshow" as the program name may be defined as the program type "movie", and the information containing "yakyu", "baseball", "soccer", "tennis", "golf", or "sumo" may be defined as the program type "sports". Then, the program name is acquired in step S21 in which the program information acquiring portion 15 acquires program type information, then the program type is identified by using the comparing information, and then steps 22 et seq. are executed.

In the telephone device of Embodiment 5 of the present invention constructed as above, such advantages can be achieved that, even when the type information of the television program, i.e., the so-called category information cannot be acquired, the category can be specified based on the television program name and then the user can set whether or not the incoming call during the watching of the television should be displayed every type of the television program or every category.

EMBODIMENT 6

A telephone device of Embodiment 6 of the present invention will be explained with reference to the drawings hereinafter.

Figures 13A, 13B:
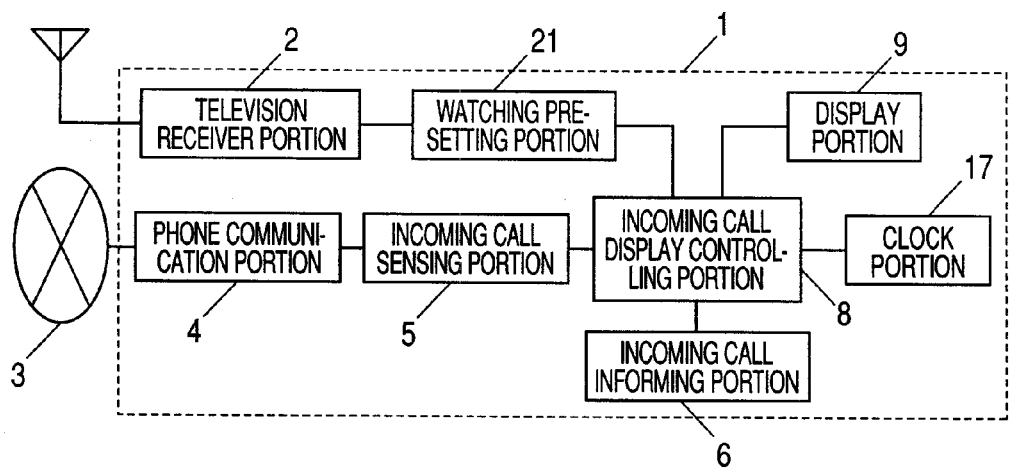
FIG. 13 (*a*) a configurative view of a telephone device of Embodiment 6 of the present invention, and (*b*) a configurative view of a phone book portion of Embodiment 6 of the present invention.

FIG. 13(a) is a configurative view of a telephone device of Embodiment 6. (The same reference symbols are affixed to the portions with the same configurations as those in Embodiments 1 to 5, and their explanation will be omitted herein.)

In the telephone device shown in FIG. 13(a), a difference from Embodiments 1 to 4 resides in that a watching presetting portion 21 for presetting the watching of the television program at a designated time, then starting the television function unless such television function is started automatically when the set time has arrived, and then changing a channel to the preset channel is provided.

FIG. 13(b) is a memory block diagram of the watching presetting portion 21. The program name and start time, finish time, channel number, etc. of the program as one program watching preset information and attached information as outline information of the program are stored as a pair as a piece of watching preset information, and incoming call indicatability information 22 is set to a piece of watching preset information respectively. For example, 1 bit is assigned to this information, and "1" denotes such a state that the display of the incoming call is "allowed" when the incoming call comes in while the user watches the preset program whereas "0" denotes such a state that the display of the incoming call is "inhibited" in the same situation.

Figure 14:
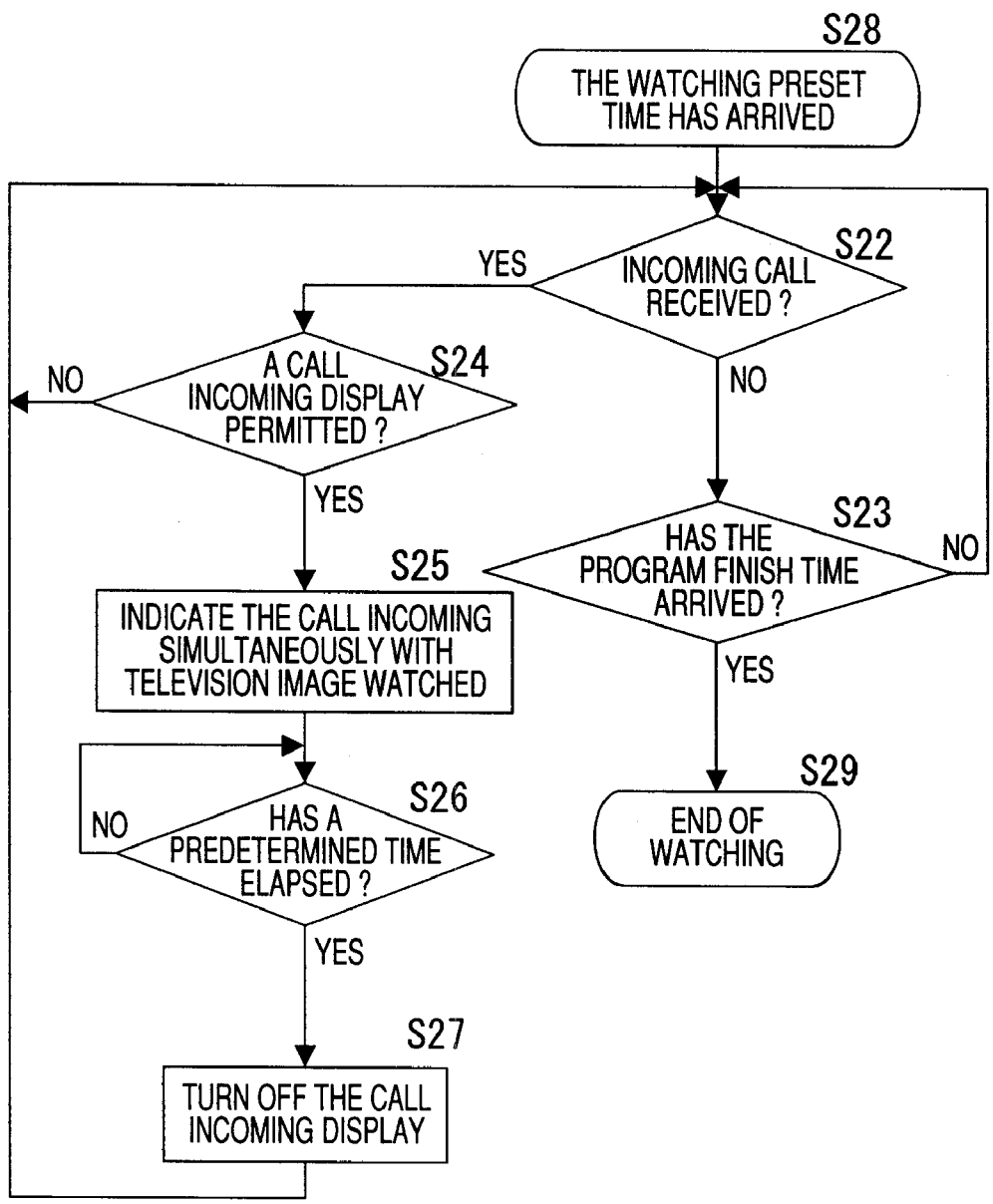
FIG. 14 A flowchart showing an operation of the telephone device of Embodiment 6 of the present invention.

A flowchart showing an operation flow of the telephone device of Embodiment 6 of the present invention is shown in FIG. 14. Steps S28, S29 are different from FIG. 12 explained in Embodiment 5. When a current time acquired from the clock portion 17 coincides with the start time of the preset program being set in the watching presetting portion 21, the television receiver portion 2 is turned on unless such television receiver portion 2 is turned on, and then the television screen on the channel of the preset program is displayed on the display portion 9 (S28). Subsequent explanations are similar to those explained in FIG. 12 in Embodiment 5, but the step S24 applied to decide whether or not the incoming call should be displayed is different. That is, the incoming call display controlling portion 8 decides whether or not the incoming call should be display, by referring to the setting of the incoming call indicatability information 22 of the preset program being set in the watching presetting portion 21 (S24). Also, in step S23 applied to decide whether or not the program finish time has arrived, if it is decided that the program finish time has arrived (Yes in S23), the process goes to the end of watching (S29).

Figure 15A:
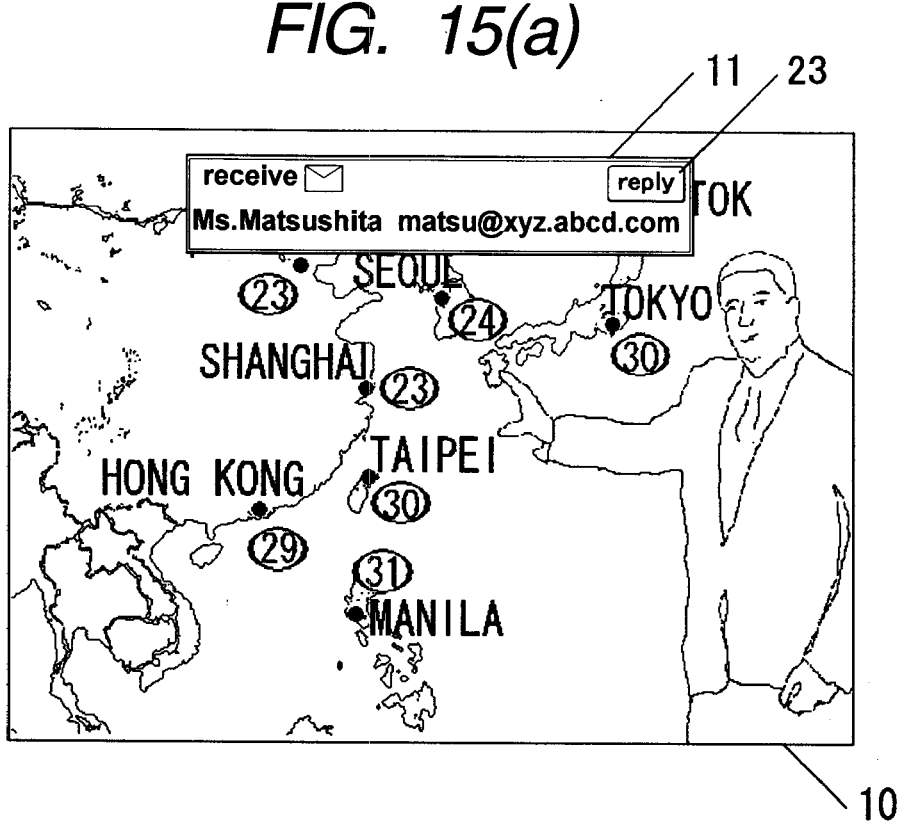
FIG. 15 (*a*) an explanatory view of an incoming call display displayed on the display portion of Embodiment 6 of the present invention, and (*b*) an explanatory view of an electronic mail reply screen displayed on the display portion of Embodiment 6 of the present invention.
Figure 15B:
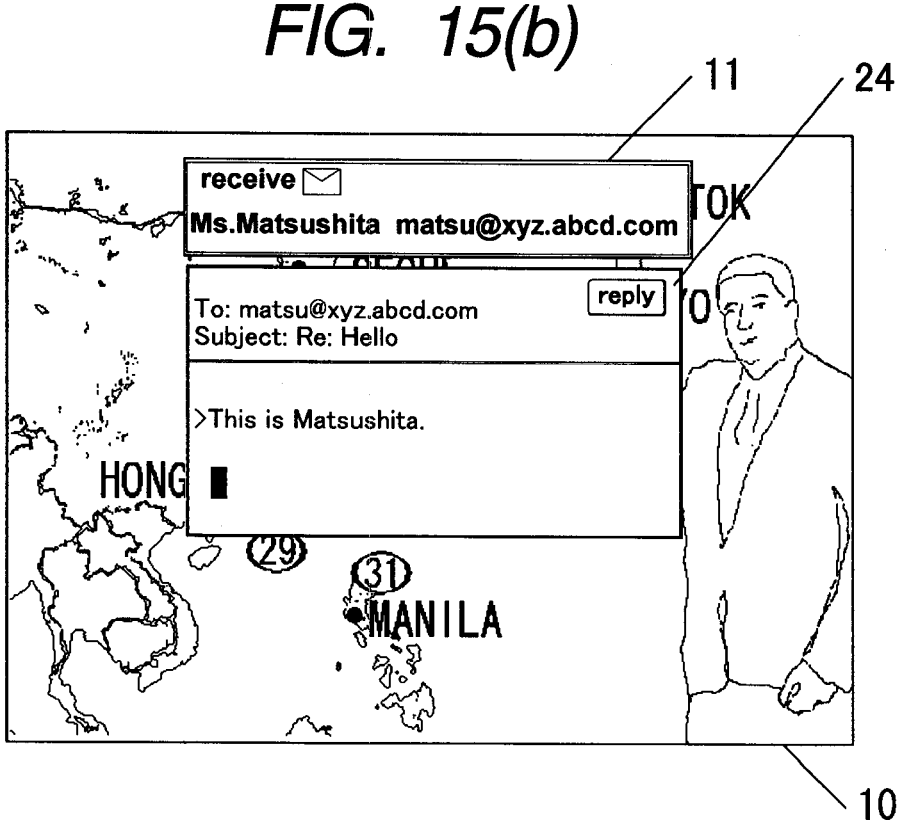

In the case where the incoming call of the electronic mail is displayed simultaneously with the television screen while the user watches the television, an electronic mail reply instructing portion 23 for accepting the instruction on the process executed to make a reply to the electronic mail in the incoming call display window 11, in which the mail address of the sender as the sender information, or the like is displayed, may be provided, as shown in FIG. 15(a). Then, when the electronic mail comes in during the user's watching of the television and the user intends to make a reply to the electronic mail in a situation that such electronic mail is being displayed, the user may send the instruction to an electronic mail reply instructing portion 23 by pushing the button, or the like to display a window 24 into which the reply to the electronic mail is input. Also, this process can be applied when the incoming call should be displayed while the user watched the television, set forth in Embodiments 1 to 3 and Embodiment 5 (S7 in FIG. 2 and FIG. 5, S25 in FIG. 12 and FIG. 14).

In the telephone device of Embodiment 6 of the present invention constructed as above, such advantages can be achieved that, while the user watches the television, it can be decided by a watching presetting function whether or not the incoming call should be displayed simultaneously with the television screen in unit of preset program. Also, such advantages can be achieved that, when the incoming call of the electronic mail is displayed simultaneously with the television screen while the user watches the television, the user can execute instantly the replay process to the electronic mail as the case may be.

The present invention is explained in detail with reference to particular embodiments. But it is obvious for those skilled in the art that various variations and modifications can be applied without departing a spirit and a scope of the present invention.

This application is based upon Japanese Patent Application (Patent Application No. 2004-291231) filed on Oct. 4, 2004; the contents of which are incorporated herein by reference.

The invention claimed is:

1. A communication device, comprising:
   a detecting portion configured to detect an incoming email from a sender;
   a phone book portion configured to register one or more senders;
   a display portion configured to display a video content;

a watching presetting portion that stores incoming email indicatability information that is set for the video content as a watching preset object to decide whether or not the email or information specifying the sender together with the video content are simultaneously displayed on the display portion when the detecting portion detects the incoming email while the video content is displayed on the display portion; and a control portion that executes control such that the incoming email indicatability information in the watching presetting portion is referenced to decide whether or not the video content, the email or the information specifying the sender, and a reply input area which indicates an instruction for making a reply email to the incoming email is acceptable are simultaneously displayed on the display portion when the video content is displayed on the display portion, wherein the video content, the email or the information specifying the sender, and the reply input area are simultaneously displayed on the display portion when the incoming email indicatability information is set as "yes" and the email or the information specifying the sender and the reply area are not displayed when the incoming email indicatability information is set as "no".

2. The communication device according to claim 1, wherein
the phone book portion is further configured to store sender information of each registered sender, and
the control portion is further configured to, when the incoming email is detected during the video content being displayed and the sender of the incoming email is registered in the phone book portion, control the display portion to display the sender information of the sender as the information specifying the sender.

3. The communication device according to claim 2, wherein
the sender information includes a name of the sender, and
the control portion is further configured to, when the incoming email is detected during the video content being displayed and the sender of the incoming email is registered in the phone book portion, control the display portion to display the name of the sender as the information specifying the sender.

4. The communication device according to claim 3, wherein the control portion is further configured to, when the incoming email is detected during the video content being displayed and the sender of the incoming email is registered in the phone book portion, control the display portion to scroll the name of the sender across the display.

5. The communication device according to claim 1, wherein the control portion is further configured to, when the incoming email is detected during the video content being displayed, control the display portion to display a part of the incoming email together with the video content.

6. The communication device according to claim 1, wherein the control portion is further configured to control the display portion to display a window for making the reply email to the incoming email, when the instruction for making the reply email is received.

7. The communication device according to claim 1, wherein
the phone book portion is further configured to store, for each of the registered senders, indicatability information indicating whether or not the sender is a specific sender, and
the control portion is further configured to, when the incoming email is detected during the video content being displayed and the sender of the incoming email is registered in the phone book portion, switch whether or not to display the information specifying the sender and the reply input area according to whether or not the sender of the incoming email is the specific sender.

8. The communication device according to claim 1, wherein
the phone book portion is configured to categorize the registered senders into one or more groups and to store indicatability information for each of the one or more groups, the indicatability information indicating whether or not the group is a specific group, and
the control portion is further configured to, when the incoming email is detected during the video content being displayed and the sender of the incoming email is registered in the phone book portion, switch whether or not to display the information specifying the sender and the reply input area according to whether or not the sender of the incoming email belongs to the specific group.

9. A telephone device, comprising:
a television receiver portion that receives a television broadcast;
a telephone communication portion that conducts a telephone communication;
an incoming call sensing portion that senses an incoming call and senses sender information obtained upon receipt of the incoming call to specify a sender;
a phone book portion that previously stores the sender information to specify the sender as phone book information;
a display portion that displays a content of the television broadcast received by the television receiver portion; and
a watching presetting portion that stores incoming call indicatability information that is set for every television program as a watching preset object to decide whether or not the sender information or the phone book information together with the content of the television broadcast are simultaneously displayed on the display portion when the incoming call sensing portion senses the incoming call while the content of the television broadcast is displayed on the display portion, and at least a start time and a finish time of a television program as the watching preset object to which watching of the television program is preset; and
a clock portion that acquires a current time; and
an incoming call display control portion that executes control such that the incoming call indicatability information in the watching presetting portion is referenced to decide whether or not the content of the television broadcast and the sender information or the phone book information are simultaneously displayed on the display portion when the current time at which the incoming call sensing portion senses the incoming call while the content of the television broadcast is displayed on the display portion is located between the start time and the finish time of the watching preset object, and the content of the television broadcast and the sender information or the phone book information are simultaneously displayed on the display portion when the incoming call indicatability information is set as "yes" and the sender information or the phone book information is not displayed when the incoming call indicatability information is set as "No".

10. The telephone device according to claim 9, wherein when the sender information or the phone book information to be displayed is obtained based on the incoming call of an electronic mail, the incoming call display control portion executes control such that predetermined several characters from a head of text of the electronic mail are displayed in addition to the sender information or the phone book information of the electronic mail when it is decided based on the incoming call indicatability information that the content of the television broadcast and the sender information or the phone book information are simultaneously displayed on the display portion.

11. The telephone device according to claim 9, wherein the incoming call display control portion includes an electronic mail reply instructing portion which executes control such that, in case the sender information or the phone book information to be displayed is obtained based on the incoming call of an electronic mail, a reply process to the electronic mail corresponding to the sender information or the phone book information is executed based on an instruction of the user while the sender information or the phone book information is displayed.

12. The telephone device according to claim 9, wherein the incoming email display control portion includes an electronic mail reply instructing portion which executes control such that, in case the sender information or the phone book information to be displayed is obtained based on the incoming email, a reply process to the email corresponding to the sender information or the phone book information is executed based on an instruction of the user while the sender information or the phone book information is displayed.

13. A communication device, comprising:
a detecting portion configured to detect an incoming email from a sender;
a phone book portion configured to register one or more senders;
a display portion configured to display a video content;
a sub-display portion;
a watching presetting portion that stores incoming email indicatability information that is set for the video content as a watching preset object to decide whether or not the email or information specifying the sender together with the video content are simultaneously displayed on the display portion when the detecting portion detects the incoming email while the video content is displayed on the display portion; and
a control portion configured to, when the incoming email is detected during the video content being displayed and the sender of the incoming email is registered in the phone book portion,
execute control such that the incoming email indicatability information in the watching presetting portion is referenced to decide whether or not the video content and a reply input area which indicates an instruction for making a reply email to the incoming email is acceptable are simultaneously displayed on the display portion when the video content is displayed on the display portion, and
control the sub-display portion to display information specifying the sender.

14. The communication device according to claim 13, wherein
the phone book portion is further configured to store sender information of each of the registered senders, and
the control portion is further configured to, when the incoming email is detected during the video content being displayed and the sender of the incoming email is registered in the phone book portion, control the sub-display portion to display the sender information of the sender as information specifying the sender.

15. The communication device according to claim 14, wherein
the sender information includes a name of the sender, and
the control portion is further configured to, when the incoming email is detected during the video content being displayed and the sender of the incoming email is registered in the phone book portion, control the sub-display portion to display the name of the sender as the information specifying the sender.

16. The communication device according to claim 15, wherein the control portion is further configured to, when the incoming email is detected during the video content being displayed and the sender of the incoming email is registered in the phone book portion, control the sub-display portion to scroll the name of the sender across the sub-display portion.

17. A telephone device, comprising:
a television receiver portion that receives a television broadcast;
an email communication portion that conducts an email communication;
an incoming email communication sensing portion that senses an incoming email and senses sender information obtained upon receipt of the incoming email to specify a sender;
a phone book portion that previously stores the sender information to specify the sender as phone book information;
a display portion that displays a content of the television broadcast received by the television receiver portion; and
a watching presetting portion that stores incoming email indicatability information that is set for every television program as a watching preset object to decide whether or not the sender information or the phone book information together with the content of the television broadcast are simultaneously displayed on the display portion when the incoming email sensing portion senses the incoming email while the content of the television broadcast is displayed on the display portion, and at least a start time and a finish time of a television program as the watching preset object to which watching of the television program is preset; and
a clock portion that acquires a current time; and
an incoming email display control portion that executes control such that the incoming email indicatability information in the watching presetting portion is referenced to decide whether or not the content of the television broadcast and the sender information or the phone book information are simultaneously displayed on the display portion when the current time at which the incoming email sensing portion senses the incoming email while the content of the television broadcast is displayed on the display portion is located between the start time and the finish time of the watching preset object, and the content of the television broadcast and the sender information or the phone book information are simultaneously displayed on the display portion when the incoming email indicatability information is set as "yes" and the sender information or the phone book information is not displayed when the incoming email indicatability information is set as "No".

18. The telephone device according to claim 17, wherein when the sender information or the phone book information to be displayed is obtained based on the incoming email, the incoming email display control portion executes control such that predetermined several characters from a head of text of the email are displayed in addition to the sender information or the phone book information of the email when it is decided based on the incoming email indicatability information that the content of the television broadcast and the sender information or the phone book information are simultaneously displayed on the display portion.

* * * * *